United States Patent [19] [11] 4,197,706
Blake [45] Apr. 15, 1980

[54] FOOT-OPERATED HYDRAULIC POWER SOURCE FOR EMERGENCY HYDRAULIC TOOLS

[76] Inventor: David R. Blake, 11200 Killarney, Onsted, Mich. 49265

[21] Appl. No.: 901,430

[22] Filed: May 1, 1978

[51] Int. Cl.[2] .......... F16D 31/02
[52] U.S. Cl. .......... 60/477; 60/478; 60/DIG. 10; 74/512
[58] Field of Search .......... 60/477, 478, DIG. 10; 74/512; 72/DIG. 5; 254/512

[56] References Cited

U.S. PATENT DOCUMENTS

| | | | |
|---|---|---|---|
| 2,226,970 | 12/1940 | Engel | 254/93 R |
| 2,588,509 | 3/1952 | Forster | 153/39 |
| 2,629,582 | 2/1953 | Stephenson et al. | 254/8 |
| 2,854,061 | 9/1958 | Romito | 155/25 |
| 3,081,066 | 3/1963 | Murawski | 254/93 |
| 3,495,431 | 2/1970 | Landon | 72/302 |
| 3,631,705 | 1/1972 | McCaffrey | 72/293 |
| 3,834,434 | 9/1974 | Walsh | 60/DIG. 10 |
| 3,891,187 | 6/1975 | Bearden | 254/93 R |
| 3,992,919 | 11/1976 | Jarman | 72/447 |

*Primary Examiner*—Edgar W. Geoghegan
*Attorney, Agent, or Firm*—Lockwood, Dewey, Alex & Cummings

[57] ABSTRACT

A readily portable hydraulic power source for supplying hydraulic fluid pressure to emergency hydraulic tools is foot-operated such that the operator's hands are left free to use the hydraulic tools and both the tools and power source may be operated by a single person. The power source includes a generally planar base member, a hydraulic pump fixedly mounted at one end of the base member, a foot-engaging planar member in generally overlying relation to the base member, a hinge connecting ends of the base member and the planar member for movement of the planar member relative to the base, and a resilient spring between the base and planar members to urge the members pivotally apart upon release of pressure from the operator's foot. The operator's foot is retained by straps and a heel retaining portion attached to the planar member, with the heel portion having an arm operatively connected to a hydraulic piston of the pump. Fluid conduits are provided from the hydraulic pump for connection to an emergency tool and from a hydraulic fluid reservoir, which is strapable about the operator's torso, to supply fluid to the hydraulic pump.

16 Claims, 5 Drawing Figures

FIG-1
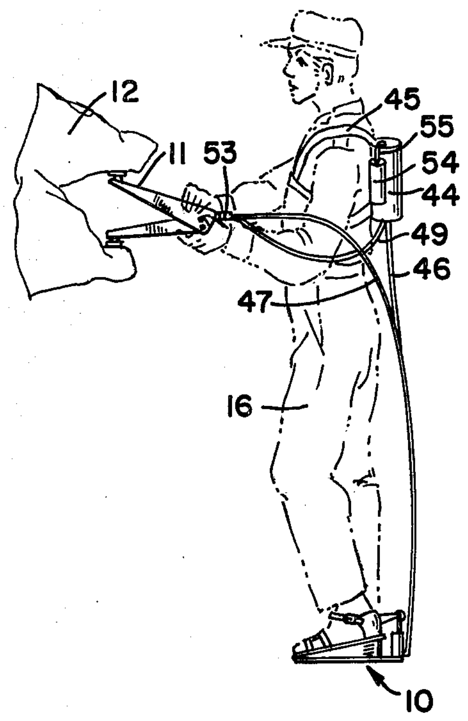
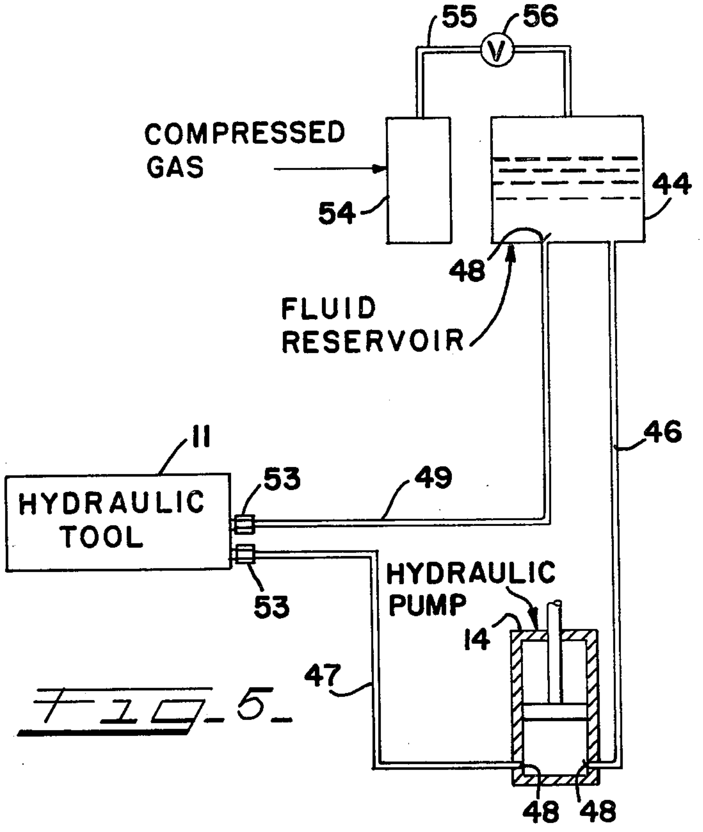
FIG-5
FIG-2
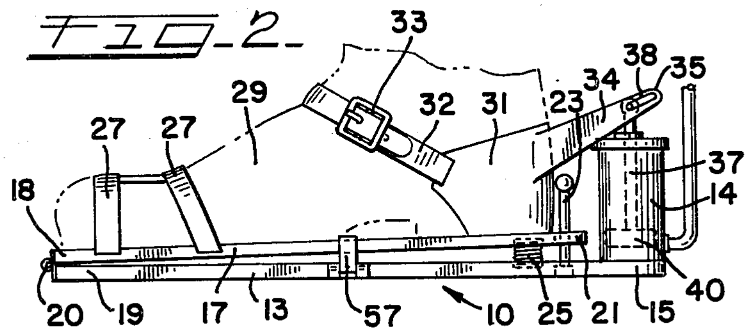
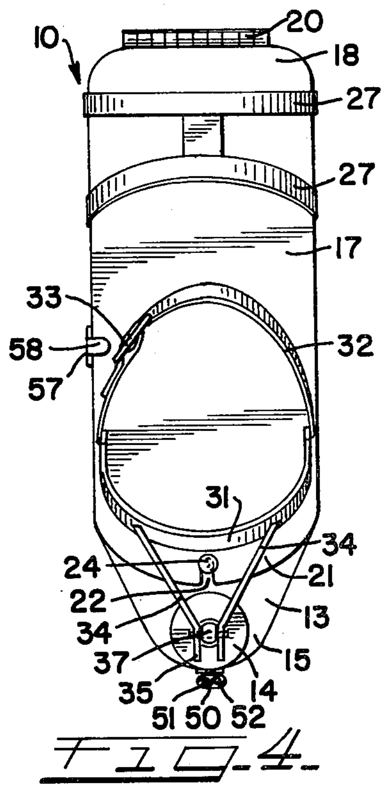
FIG-4
FIG-3
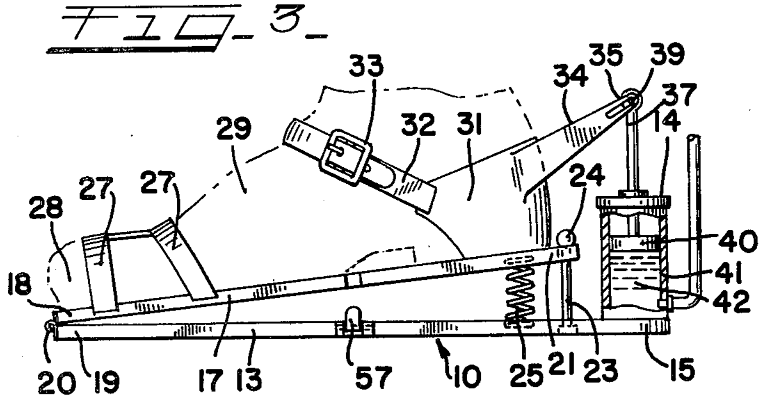

FOOT-OPERATED HYDRAULIC POWER SOURCE FOR EMERGENCY HYDRAULIC TOOLS

BACKGROUND OF THE INVENTION

This invention relates in general to pumps for supplying hydraulic fluid pressure and is more particularly concerned with a readily portable and foot-operated hydraulic power source for supplying hydraulic fluid pressure to emergency hydraulic tools wherein the operator's foot is retained by the foot-operated power source such that the operator's hands are free to use and manipulate hydraulic tools and both the tools and power source are simultaneously operable by a single person.

Firemen, police officers and emergency personnel often encounter the need to free trapped persons who also may be injured. Such situations occur in automobile mishaps, in burning or collapsed buildings and the like. A variety of hydraulically operated tools are available to assist in prying open smashed vehicles or portions of buildings to provide sufficient space for the trapped person to escape or to be removed for medical treatment.

Power sources for such emergency tools are also available, but are sufficiently bulky or have other operational shortcomings that the power sources are usually carried or operated by certain types of emergency crews, such as by ambulance personnel. Such power sources frequently require electrical power or have a gasoline internal combustion engine. These types of power sources usually require at least two people to transport the power source to the accident scene due to the weight thereof and at least two people may also be required to separately operate the emergency tools and the power source.

As a result of the bulkiness of the available power sources and the personnel required to effectively operate both the power source and the emergency tools, most emergency vehicles are only equipped with rudimentary tools, such as axes and the like. For instance, when police officers arrive on an accident scene, another emergency crew with appropriate tools and power sources will be called to the accident scene to free a person trapped in a damaged automobile. The additional delay in freeing the person from the damaged automobile may needlessly place the person's life in jeopardy in some instances.

A principal object of the present invention is therefore to provide a new and improved foot-operated power source for emergency hydraulic tools which will provide hydraulic fluid pressure therefor by a simple stepping action such that the same person has his hands free to simultaneously operate an appropriate hydraulic tool, without the need to wait for additional emergency personnel to arrive at the accident scene.

A related object is to provide a foot-operated hydraulic power source which is sufficiently inexpensive, readily portable and operable by a single person such that all types of emergency vehicles may be provided with a hydraulic power source in accordance with the invention and rescue of a trapped person need not be delayed until other types of emergency personnel with tools and prior art power sources arrive at the accident scene.

Another object of the present invention is to provide a mobile power source without the use of gasoline or electric power such that the power source and emergency tools may be used at a site remote from the emergency vehicle or from roadways.

Yet another object is to generate adequate hydraulic fluid pressure for operating emergency tools by utilizing the downward forces exerted by a normal walking or stepping action, which forces are equal to the weight of the person, including the additional emergency equipment carried thereby.

Another object of the present invention is to provide a hydraulic power source for operating emergency tools which is substantially more economical than electric or gasoline power sources such that it will be feasible to provide more power sources and emergency tool units to police cars, ambulances, fire engines and the like. A related object is to provide a power source of substantially less bulk and weight which will make it practical for all types of emergency vehicles to carry the power source and associated tools.

It is further intended to provide a hydraulic power source which is more reliable than gasoline engine power sources which may encounter starting difficulties due to extended periods of nonuse.

SUMMARY OF THE INVENTION

The hydraulic power source of the present invention includes a generally planar base member with a hydraulic pump fixedly mounted at one end of the base member. The hydraulic pump includes a hydraulic cylinder adapted to contain hydraulic fluid therein and a hydraulic piston in sealing engagement with the hydraulic cylinder such that hydraulic pressure may be created by movement of the piston against the hydraulic fluid. A foot-engaging planar member, of shorter dimension than the base member, is in generally overlying relationship therewith. The base member and the foot-engaging member are hingedly secured at ends thereof opposite to the hydraulic pump for pivotal movement of the foot-engaging member relative to the base member. A plurality of straps extending from the foot-engaging member secure the operator's foot therein. Rising upwardly from the end of the foot-engaging member nearest the hydraulic pump is a heel engaging portion which also has a pair of arms extending rearwardly thereof for operative attachment to a stem of the hydraulic piston which protrudes upwardly out of the hydraulic cylinder. Resilient means, in the form of a coil spring, are disposed between the base member and the foot-engaging member for urging the foot-engaging member upwardly, thereby also lifting the hydraulic piston to reset the hydraulic pump for the next pressure stroke. A retaining means extending between the base member and the foot-engaging member limits the displacement between said members caused by the resilient means.

Fluid conduit means delivers the hydraulic pressure from the hydraulic pump to a hydraulic tool. A hydraulic reservoir for storing and containing a suitable volume of hydraulic fluid, includes strap means for securing the reservoir about a portion of the operator's torso. Another fluid conduit from the reservoir to the hydraulic pump supplies hydraulic fluid thereto. A return conduit from the hydraulic tool returns hydraulic fluid to the reservoir when the fluid pressure in the tool is released. A cylinder of compressed gas may be in gaseous communication with the reservoir for exerting gaseous pressure on the fluid in the reservoir to supplement the hydraulic pumping action of the power source.

BRIEF DESCRIPTION OF THE DRAWINGS

The features of the present invention, which are believed to be novel, are set forth with particularity in the appended claims. The invention, together with the further advantages thereof can best be understood by reference to the following description, taken in conjunction with the accompanying drawings in the several figures, in which like reference numerals identify like elements, and in which:

FIG. 1 is a side elevational view of a foot-operated hydraulic power source of the present invention illustrating use of the power source in combination with one type of hydraulic tool, with the tool and power source both being simultaneously operable by a single person;

FIG. 2 is a close-up side elevational view of the foot-operated power source of FIG. 1 with the hydraulic piston and the foot-engaging member fully compressed, as at the end of a pressure stroke;

FIG. 3 is a close-up side elevational view, similar to FIG. 2, but with the hydraulic piston and foot-engaging member in a fully raised position in preparation for another hydraulic fluid pressure stroke;

FIG. 4 is a top plan view of the foot-operated power source of FIGS. 2 and 3; and FIG. 5 is a schematic flow diagram of the hydraulic fluid system between the hydraulic tool, the fluid reservoir and the foot-operated pump.

DESCRIPTION OF A PREFERRED EMBODIMENT

Referring first to FIGS. 1 through 4, there is illustrated a foot-operated hydraulic power source generally designated 10, for supplying hydraulic fluid pressure to one type of emergency hydraulic tool 11. The tool 11 illustrated in FIG. 1 is particularly adapted for prying portions of an object 12 apart to free a person from entrapment therein, or for related purposes. The object 12 may include portions of a motor vehicle, or various portions of building structures and the like, and may be located wherever an accident, fire or other situation causes a person to be trapped. It is understood that the hydraulic power source of the present invention is usable with other types of hydaulic tools than the tool 11 illustrated in FIG. 1.

A base member 13 (FIGS. 2 and 3) of the hydraulic power source 10 is generally planar, with a bottom surface thereof for engaging against the ground or other suitable surface. A hydraulic pump 14 is fixedly attached to a top surface of one end 15 of the base member 13.

A foot-engaging member 17 overlies the base member 13 with one end 18 of the member 17 secured to an end 19, opposite the end 15, of the base member 13 by a hinge 20. An end 21 of the foot-engaging member 17, opposite the end 18 and nearest the hydraulic pump 14, is provided with a slot 22 (FIG. 4) in which is located an upstanding retaining stem 23 with an enlarged head portion 24. The retaining stem 23 is secured into the base member 13. Adjacently disposed to the stem 23 is a resilient coil spring 25 operating between the base member 13 and the foot-engaging member 17 to urge or bias said member 13, 17 apart. It is therefore seen that the foot-engaging member 17 pivots about a point defined by the hinge 20 such that the slot 22 in the foot engaging member 17 slidably moves along the stem 23, and that upward movement of the end 21 of the foot-engaging member 17 is limited or stopped by the enlarged head portion 24 of the stem 23. The stem 23 also limits any lateral movement of the foot-engaging member 17.

Attached to the foot-engaging member 17 near the end 18 are a pair of straps 27 for receiving a toe portion 28 of a foot 29. It will be understood that while the term "foot" is used herein, the foot 29 could include conventional forms of footwear over the operator's foot such as shoes, boots and the like. Therefore, the person 16 using the hydraulic power source 10 need not remove his footwear before doing so.

Rigidly secured to a top surface of the foot-engaging member 17 near the end 21 thereof is a heel engaging portion 31 which is curved to accommodate and receive the heel of the foot 29. A strap 32 extends between opposite sides of the heel engaging portion 31 and has a buckle 33 for opening the strap 32 to receive the foot 29 against the foot-engaging member 17 and for adjustment of the strap 32 to accomodate various sizes of feet. The strap 32 is substantially disposed around an ankle of the foot 29 to keep the foot 29 disposed rearwardly against the heel engaging portion 31 such that the weight of the person 16 will bear upon the foot-engaging member 17 near the end 21 for maximum leverage in the hydraulic power source 10, as will become more apparent hereinafter.

While the preferred embodiment of the power source 10 disclosed herein uses straps 27, 32 to retain the foot 29 against the foot-engaging member 17, it will readily be appreciated that other embodiments would suffice. For example, shoes or boots of the slip-on type or boots with zippers could alternatively be employed.

A pair of arms 34 (FIG. 4) extend outwardly and rearwardly from the heel engaging portion 31 with ends 35 of the arms 34 being in a generally parallel and spaced apart relationship for receiving therebetween a stem 37 which is attached to a piston 40 in the hydraulic pump 14. The ends 35 of the arms 34 have a longitudinally disposed slot 38 which engages a pin 39 through an apertured end of the stem 37. A pivoting and sliding connection between the arms 34 and the stem 37 is thereby provided as the foot-engaging member 17 is moved up and down by the operator's foot 29 to provide pumping action by the piston 40.

The piston 40 makes sealing engagement with a hydraulic cylinder 41 of the pump 14 such that pressure may be exerted by the piston 40 on fluid 42 contained in the cylinder 41 as the weight of the operator bears upon the foot-engaging member 17. The spring 25 exerts sufficient force between the members 13, 17 to overcome the frictional resistance between the piston 40 and the cylinder 41 to urge the member 17 upwardly when the operator removes his weight from the member 17.

To obtain maximum leverage in the relationship of the foot 29 and the foot-engaging member 17 to the hydraulic pump 14, and therefore maximum fluid pressure in the pump 14, the pump 14 is preferably located on the base member 13 as close to the end 21 of the foot-engaging member 17 as is possible without interfering with movement thereof. The heel engaging portion 31 is likewise located as close as possible to the end 21 of the foot-engaging member 17. Most of the weight of the operator 16 will be exerted by his heel against the heel engaging member 17 and the operator's heel should therefore be located as close to the pump 14 as possible to obtain maximum leverage during the pumping action.

Hydraulic fluid pressures approaching 1000 psi can be created by a person weighing 200 pounds, including the weight of clothing and other gear, by a piston 40 of ½ inch diameter. If the tool 11 is provided with a 2-inch diameter cylinder, 1000 psi of fluid pressure will supply forces of about 3200 pounds. Similarly, a 3-inch cylinder will supply forces of about 7200 pounds.

The routing of hydraulic fluid between the hydraulic pump 14, the hydraulic tool 11 and a hydraulic fluid reservoir 44 is best seen with reference to FIGS. 1 and 6. A fluid reservoir 44 is secured about the operator 16 by straps 45 over the operator's shoulders and about his torso. A fluid conduit 46 is provided from the reservoir 44 to the pump 14 to supply hydraulic fluid thereto. Another fluid conduit 47 of suitable pressure rating supplies the hydraulic fluid under pressure from the pump 14 to the hydraulic tool 11. A return fluid conduit 49 permits the fluid to return from the hydraulic tool to the reservoir 44 when fluid pressure is released in the hydraulic tool 11 by a valve (not shown) usually associated with such tools. The conduits 47, 49 are provided with quick-disconnect couplings 53 for attachment to the tool 11 such that the power source 10 may be easily connected to various types of hydraulic tools. Each of the conduits 46, 47, 49 is provided with an appropriate check valve 48 for controlling the direction of hydraulic fluid flowing therethrough. A portion of the fluid conduits 46, 47 which communicate with the hydraulic pump 14 may be a single conduit 50 having two fluid passages 51, 52 as illustrated in FIG. 4.

If desired, a source of compressed gas 54 may communicate with the fluid reservoir 44 by means of a fluid conduit 55 and an associated control valve 56 to augment the hydraulic pumping action of the power source 10. For instance, the compressed gas 54 could be used to establish an initial pressure level in the fluid conduits 46, 47 before the operator 16 begins pumping the power source 10.

A locking retainer 57 of "L" shape is hingedly secured along one side of the base member 13 to lock the members 13, 17 in the fully compressed condition, as illustrated in FIG. 2, for more efficient storage of the power source 10 when not in use. One leg 58 (FIG. 4) of the locking retainer 57 engages against the top surface of the foot engaging member 17 to retain the members 13, 17 in the compressed condition.

It will be understood that various changes and modifications may be made without departing from the spirit of the invention as defined in the following claims, and equivalents thereof.

I claim:

1. A portable, free-standing foot-operated hydraulic power source for supplying hydraulic fluid pressure to hydraulic tools, said hydraulic power source comprising:

- a substantially flat support platform adapted to rest freely on any relatively flat surface;
- pump means fixedly carried by said platform, said pump means including a hydraulic piston in sealing engagement with a hydraulic cylinder, said hydraulic cylinder adapted to contain hydraulic fluid, said hydrualic piston adapted to create hydraulic pressure by movement of said hydraulic piston against said hydraulic fluid;
- fluid conduit means to deliver the hydraulic pressure from said pump means to a hydraulic tool; and
- a foot-engaging member for retaining an operator's foot therein, said foot-engaging member being pivotally mounted atop said platform in a general overlying relationship and operatively connected to said hydraulic piston for movement thereof to create hydraulic pressure.

2. The hydraulic power source defined in claim 1 wherein said pump means is mounted at one end of said platform, and said foot-engaging member is planar and of shorter dimension than said platform, a heel engaging portion attached to the foot-engaging member near one end thereof, an arm projecting outwardly and rearwardly from the heel engaging portion for operative attachment to said hydraulic piston, and means for securing the operator's foot relative to said foot-engaging member.

3. The hydraulic power source defined in claim 2 wherein said means for securing the operator's foot comprises a plurality of straps connected to said foot-engaging member and at least one of said straps is adjustable.

4. The hydraulic power source as defined in claim 1 wherein said platform and said foot-engaging member are hingedly secured at ends thereof opposite to said pump means for pivotal movement of said foot-engaging member relative to said platform.

5. The hydraulic power source defined in claim 1 further comprising resilient biasing means disposed between said platform and said foot-engaging member for urging said foot-engaging member away from said platform.

6. The hydraulic power source defined in claim 1 further comprising retainer means extending between said platform and said foot-engaging member for limiting the displacement of said foot-engaging member from said platform by said biasing means.

7. The hydraulic power source defined in claim 1 further comprising locking means for securing said foot-engaging member adjacent to said platform when said hydraulic power source is not in use.

8. The hydraulic power source defined in claim 1 further comprising hydraulic fluid reservoir means for storing a suitable volume of hydraulic fluid, said hydraulic fluid reservoir means including means for securing said reservoir means about a portion of an operator's torso.

9. The hydraulic power source defined in claim 8 further comprising compressed gaseous means in fluid communication with said reservoir means for exerting gaseous pressure on the fluid contained in said reservoir means.

10. A foot-operated and readily portable hydraulic power source for supplying hydraulic fluid pressure to hydraulic tools, said power source comprising:

- a generally planar base member;
- a hydraulic pump fixedly mounted relative to said base member, said hydraulic pump including a hydraulic piston in sealing engagement with a hydraulic cylinder, said hydraulic cylinder adapted to contain hydraulic fluid, said hydraulic piston adapted to create hydraulic pressure by movement of said hydraulic piston against said hydraulic fluid;
- hydraulic fluid reservoir means for storing a suitable volume of hydraulic fluid, said hydraulic fluid reservoir means including means for securing said reservoir means about a portion of an operator's torso;
- a fluid conduit to supply the hydraulic fluid from said reservoir means to said hydraulic pump;
- another fluid conduit to deliver the hydraulic pressure from said hydraulic pump to a hydraulic tool;

foot-engaging means for retaining an operator's foot therein, said base member and said foot-engaging means being hingedly secured at ends thereof opposite to said hydraulic pump for pivotable movement of said foot-engaging means relative to said base member, said foot-engaging means comprising a planar foot-engaging member of shorter dimension than said base member and in generally overlying relationship therewith, a heel engaging portion attached to the foot-engaging member near one end thereof, an arm projecting outwardly and rearwardly from the heel engaging portion for operative attachment to said hydraulic piston, and means for securing the operator's foot relative to said foot-engaging member;

resilient biasing means disposed between said base member and said foot-engaging means for urging said foot-engaging means away from said base means; and retainer means extending between said base member and said foot-engaging means for limiting the displacement of said foot-engaging means from said base member by said biasing means.

11. A portable foot-operated hydraulic power source for supplying hydraulic fluid pressure to hydraulic tools, said hydraulic power source comprising:

base means;

pump means fixedly mounted relative to said base means, said pump means including a hydraulic piston in sealing engagement with a hydraulic cylinder, said hydraulic cylinder adapted to contain hydraulic fluid, said hydraulic piston adapted to create hydraulic pressure by movement of said hydraulic piston against said hydraulic fluid;

fluid conduit means to deliver the hydraulic pressure from said pump means to a hydraulic tool;

foot-engaging means for retaining an operator's foot therein, said foot-engaging means being movable relative to said base means and operatively connected to said hydraulic piston for movement thereof to create hydraulic pressure;

said pump means being mounted at one end of said base means, and said foot-engaging means comprising a planar foot-engaging member of shorter dimension than said base means and in generally overlying relationship therewith, a heel engaging portion attached to the foot-engaging member near one end thereof, an arm projecting outwardly and rearwardly from the heel engaging portion for operative attachment to said hydraulic piston, and means for securing the operator's foot relative to said foot-engaging member.

12. The hydraulic power source defined in claim 11 wherein said means for securing the operator's foot comprises a plurality of straps connected to said foot-engaging memeber and at least one of said straps is adjustable.

13. The hydraulic power source defined in claim 11 wherein said base means and said foot-engaging member are hingedly secured at ends thereof opposite to said pump means for pivotal movement of said foot-engaging member relative to said base means.

14. The hydraulic power source defined in claim 11 further comprising resilient biasing means disposed between said base means and said foot-engaging means for urging said foot-engaging means away from said base means.

15. The hydraulic power source defined in claim 14 further comprising retainer means extending between said base means and said foot-engaging means for limiting the displacement of said foot-engaging means from said base means by said biasing means.

16. The hydraulic power source defined in claim 11 further comprising hydraulic fluid reservoir means for storing a suitable volume of hydraulic fluid, said hydraulic fluid reservoir means including means for securing said reservoir means about a portion of an operator's torso and compressed gaseous means in fluid communication with said reservoir means for exerting gaseous pressure on the fluid contained in said reservoir means.

* * * * *